US006652433B1

(12) United States Patent
Ishikawa et al.

(10) Patent No.: US 6,652,433 B1
(45) Date of Patent: Nov. 25, 2003

(54) OIL APPLICATION ROLLER FOR USE IN AN IMAGE-FORMING APPARATUS

(75) Inventors: Youichi Ishikawa, Shizuoka-ken (JP); Kazuhiko Serizawa, Shizuoka-ken (JP)

(73) Assignees: Nitto Kogyo Co. Ltd., Tokyo (JP); Hodaka Kogyo, Mishima (JP)

( * ) Notice: Subject to any disclaimer, the term of this patent is extended or adjusted under 35 U.S.C. 154(b) by 0 days.

(21) Appl. No.: 09/557,411

(22) Filed: Apr. 21, 2000

(30) Foreign Application Priority Data

Apr. 22, 1999 (JP) .......................................... 11-114872
Dec. 24, 1999 (JP) .......................................... 11-367582

(51) Int. Cl.[7] ............................................... F16C 13/00
(52) U.S. Cl. ...................................... 492/56; 29/895.32
(58) Field of Search .............................. 492/56, 28, 53, 492/59, 48, 17, 24; 29/895.3, 895.32

(56) References Cited

U.S. PATENT DOCUMENTS 3,964,431 A * 6/1976 Namiki ........................ 118/60
3,976,814 A * 8/1976 Murphy ...................... 427/226
4,056,706 A * 11/1977 Strella ........................ 219/216
4,185,140 A * 1/1980 Strella et al. ............... 219/216
4,258,648 A * 3/1981 Leising et al. ................ 118/60
4,659,621 A 4/1987 Finn et al. .................. 428/339
4,766,843 A * 8/1988 Murakami et al. .......... 118/661
5,232,499 A * 8/1993 Kato et al. .................. 118/244
5,319,430 A * 6/1994 DeBolt et al. ................ 492/28
5,325,637 A * 7/1994 Yasuda et al. ................ 51/319
5,468,531 A * 11/1995 Kikukawa et al. ......... 428/36.5
5,482,552 A * 1/1996 Kikukawa et al. .......... 118/264
5,523,123 A * 6/1996 Ginzburg et al. ............. 492/28
5,716,700 A * 2/1998 Kikukawa et al. .......... 428/339
5,853,832 A * 12/1998 Ishikawa ..................... 492/53
5,954,910 A * 9/1999 Kikukawa et al. ....... 156/307.1
6,058,285 A * 5/2000 Takizawa et al. ........... 399/286

FOREIGN PATENT DOCUMENTS

EP 0 455 470 A2 11/1991
EP 0 616 271 A2 9/1994
GB 2 284 813 6/1995
JP 62178992 A * 8/1987 ............ B23B/5/32
JP 410326039 A * 12/1998
JP 10-326039 * 9/2001

* cited by examiner

*Primary Examiner*—Gregory Vidovich
*Assistant Examiner*—Marc Jimenez
(74) *Attorney, Agent, or Firm*—Armstrong, Westerman & Hattori, LLP

(57) ABSTRACT

An oil application roller has a core shaft and an oil retention/supply layer formed to cover the outer peripheral surface of the core shaft. The oil retention/supply layer includes a porous elastic material which exhibits no substantial swelling against an offset-preventing oil used, and is impregnated with a mixture containing an offset-preventing oil and a curable oil-retention material. The curable oil-retention material is cured.

21 Claims, 4 Drawing Sheets

OIL APPLICATION ROLLER FOR USE IN AN IMAGE-FORMING APPARATUS

CROSS-REFERENCE TO RELATED APPLICATIONS

This application is based upon and claims the benefit of priority from the prior Japanese Patent Applications No. 11-114872, filed Apr. 22, 1999; and No. 11-367582, filed Dec. 24, 1999, the entire contents of which are incorporated herein by reference.

BACKGROUND OF THE INVENTION

The present invention relates to an oil application roller for use in a fixing unit of an electrophotographic image-forming apparatus, such as a copying machine, facsimile, or laser beam printer.

An electrophotographic image-forming apparatus basically comprises an electrostatic latent image-forming unit for forming an electrostatic latent image on a photosensitive drum by exposing the photosensitive drum in accordance with the predetermined image information. A developing unit is provided for forming a toner image (visible image) corresponding to the electrostatic latent image by supplying and attaching toner from a developing roller onto the electrostatic latent image formed on the photosensitive drum. A transferring unit transfers the toner image formed on the photosensitive drum on recording paper, and a fixing unit firmly fixes the transferred toner image on the recording paper.

At the fixing unit, energy of pressure and heat is applied through a fixing member, such as a fixing roller or a fixing belt, to the unfixed toner image held on the recording paper. The toner particles of the toner image become semi-melted and permeated into the recording paper as the energy is applied, thus completing the fixing process. Since the toner particles are adhesive during the fixing process, an offset-preventing oil (for example, silicone oil) is applied from an oil application roller to a surface of the fixing member. Such an oil application roller is desired to be capable of applying a very small amount (usually, 0.5 to 2 mg on an A4 sheet of paper) of an offset-preventing oil onto the fixing member steadily for a long period of time.

For example, an oil application roller is known in the art which comprises a core shaft with a sheet of non-woven paper, such as aramid paper, wound thereon. The non-woven paper is impregnated with a silicone oil. Another sheet of non-woven paper is wound to cover the oil-impregnated paper. However, it has been found that an oil application roller of this type is not able to stably form a nip required for the oil application, between the oil application roller and the fixing member, under a small load. As a result, the amount of oil applied becomes nonuniform with time. The uppermost non-woven paper has a poor releaseability and clogs up due to contamination by the toner. Thus, the oil application roller of the type mentioned above cannot provide a constant oil amount applied.

In addition, an oil application roller is also known which comprises a core shaft with a layer of a silicone sponge placed thereon. The sponge layer is impregnated with a silicone oil. A non-woven fabric such as aramid felt is provided to cover the oil-impregnated silicone sponge layer. However, an oil application roller of this type cannot supply the oil onto the fixing member for a long period of time. This is because, when impregnating the silicone sponge with the silicone oil, the silicone sponge becomes swelled, resulting in an insufficient amount of oil impregnated. Further, it has been found that, as the oil is applied, the surface hardness of this oil application roller increases, with the result that the width of a nip between the oil application roller and the fixing member becomes smaller, leading to the reduction in the amount of oil applied. In addition, the uppermost non-woven fabric has the same drawback as in the above-noted prior art oil application roller.

Thus, the prior art oil application rollers cannot steadily apply a very small amount of an offset-preventing oil for a long period of time.

BRIEF SUMMARY OF THE INVENTION

It is, therefore, an object of the present invention to provide an oil application roller which can steadily apply a very small amount of an offset-preventing oil for a long period of time.

The present inventors have studied on oil application rollers in an attempt to achieve the above-noted object. As a result, the present inventors have found that the above-noted object can be achieved by constituting an oil retention/supply layer, which retains an offset-preventing oil therein and supplies the oil therefrom, by a porous elastic material which exhibits no substantial swelling against the offset-preventing oil used. The oil retention/supply layer is impregnated with an offset-preventing oil together with a curable rubber, which is then cured. The present invention is based on these findings.

Thus, the present invention provides an oil application roller comprising a core shaft, and an oil retention/supply layer formed to cover the outer peripheral surface of the core shaft and comprising a porous elastic material which exhibits no substantial swelling against an offset-preventing oil used, the oil retention/supply layer being impregnated with a mixture containing an offset-preventing oil and a curable oil-retention material, with the curable oil-retention material being cured.

According to the present invention, there is also provided an oil application roller comprising a core shaft, and an oil retention/supply layer formed to cover the outer peripheral surface of the core shaft and comprising a porous melamine resin elastic material, the oil retention/supply layer being impregnated with a mixture containing an offset-preventing oil and a curable oil-retention material, with the curable oil-retention material being cured.

According to the present invention, there is further provided an oil application roller comprising, as an uppermost layer, an oil retention/supply layer comprising a porous elastic material which exhibits no substantial swelling against an offset-preventing oil used, the oil retention/supply layer containing a mixture containing an offset-preventing oil and a curable oil-retention material such that an amount of the oil supplied from the oil retention/supply layer may be substantially constant, with the curable oil-retention material being cured.

In the present invention, the curable oil-retention material may be a curable or vulcanizable rubber. It is further preferred that the offset-preventing oil comprises an silicone oil, and the curable oil-retention material comprises a two-pack or one-pack curable or vulcanizable silicone rubber.

Further, in the present invention, it is preferred that the offset-preventing oil and the curable oil-retention material are impregnated at an initial weight ratio of from about 1:1 to 20:1.

In a preferred embodiment of the present invention, the oil retention/supply layer has, on its peripheral surface, a surface layer which at least fills pores present at the surface thereof resulting from the porousness of the oil retention/supply layer. The surface layer may comprise a mixture containing an offset-preventing oil and a curable oil-retention material.

Further, an oil application roller according to the present invention can exhibit a surface glossiness of 1% or more. Particularly, when the oil application roller has the surface layer as described above, the roller may exhibit a surface glossiness of 3% or more.

An oil application roller according to the present invention preferably has a regular crown shape.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
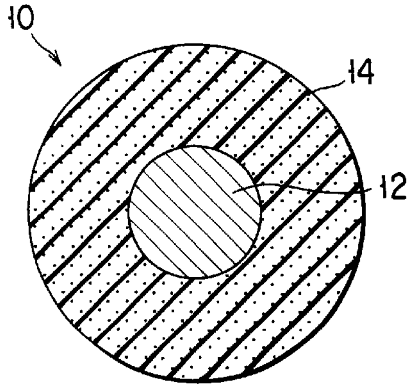
FIG. 1 is a schematic sectional view illustrating an oil application roller according to a first embodiment of the present invention.

FIG. 1 is a sectional view schematically illustrating an oil application roller according to a first embodiment of the present invention.

As shown in FIG. 1, an oil application roller 10 according to the present invention basically has a cylindrical core shaft (roller body) 12 and an oil retention/supply layer 14 provided to cover a substantially whole cylindrical surface of the core shaft 12. As described in detail later, the oil retention/supply layer 14 is impregnated with a mixture of an offset-preventing oil and a curable oil-retention material, and the curable oil-retention material has been cured.

In the present invention, the core shaft 12 is not different from a conventional one, and can be made of a metal such as iron.

The oil retention/supply layer 14 covering the core shaft 12 constitutes the outermost layer of the oil application roller of the present invention. The layer 14 is composed of a porous elastic material which exhibits no substantial swelling against an offset-preventing oil used.

The term "no substantial swelling" means that, even when the oil retention/supply layer 14 is impregnated with an offset-preventing oil to the maximum, the volume of the oil retention/supply layer 14 does not substantially increase. Preferably, an increase in the volume is 5% or less, more preferably 2% or less, and most preferably 0%.

In the present invention, the term "porous" means that the oil retention/supply layer is porous of an open cell structure. An expansion ratio of the oil retention/supply layer 14 of the present invention can be 90 to 100 times its original volume. The oil retention/supply layer 14 can be impregnated with an offset-preventing oil in an amount about 100 times its own weight.

The oil retention/supply layer 14 of the present invention is elastic. The term "elastic" here means that the layer is elastic as defined in Page 29 of "JIS Handbook 19 Rubber, 1997."

If too thin, the resultant oil retention/supply layer 14 is not capable of being impregnated with a required amount of oil. If too thick, the resultant oil retention/supply layer 14 is not likely to be impregnated uniformly with a mixture of an offset-preventing oil and a curable oil-retention material. The thickness of the oil retention/supply layer 14 is preferably in a range of from 1 mm to 25 mm.

As a porous elastic material constituting such an oil retention/supply layer 14, a porous melamine resin is particularly preferred. Such a porous melamine resin is manufactured by and commercially available from BASF under the tradename of BASOTECT, for example.

The oil retention/supply layer 14 is impregnated with a mixture containing an offset-preventing oil and a curable or vulcanizable oil-retention material. The curable oil-retention material is cured.

As the offset-preventing oil, a conventional silicone oil, such as dimethyl silicone oil, can be suitably used.

The curable oil-retention material is impregnated in the oil retention/supply layer 14 in the form of a mixture with the offset-preventing oil. Thus, it suffices that the mixture may exhibits fluidity which allows it to be impregnated into the oil retention/supply layer 14. Accordingly, as such a curable oil-retention material, not only a liquid curable rubber, but also a curable rubber compound can be used. However, a curable liquid rubber, particularly, a curable liquid silicone rubber, is preferably used in the present invention. Such a liquid silicone rubber is commercially available, including a room-temperature vulcanizing two-pack silicone rubber, KE 108 (condensation curing type), produced by SHIN-ETSU CHEMICAL, Japan.

In the present invention, a one-pack curable silicone rubber may also be preferably used as the curable oil-retention material. Examples of the one-pack curable silicone rubber includes room-temperature vulcanizing one-pack silicone rubbers of de-acetone curing type, de-oxime (oxime-eliminating) curing type, de-aceticacid (acetic acid-eliminating) curing type, and de-alcohol (alcohol-eliminating) curing type. Particularly, one-pack room-temperature vulcanizing silicone rubbers of de-acetone curing type, de-oxime curing type, and de-aceticacid curing type are preferable because these types are excellent in adhesive strength. The one-pack curable silicone rubbers of these types can be readily cured by moisture in air. Such a one-pack curable silicone rubber is commercially available as room-temperature vulcanizing silicone rubber, KE series, from SHIN-ETSU CHEMICAL, INC, Japan.

The offset-preventing oil and the curable oil-retention material can be preferably used at an initial weight ratio (i.e., a weight ratio when the oil retention/supply layer 14 is impregnated therewith to produce the oil application roller of the invention) of from about 1:1 to 20:1, more preferably from about 5:1 to about 10:1. At the initial weight ratio within the range given above, an oil application roller according to the present invention can supply the oil in an almost constant amount (i.e., constant within a range of from 0.5 mg to 2 mg of oil per A4 sheet of paper). Without being bound by a theory, it is believed that the curable oil-retention material is cured to form a cross-linked network structure, which regulates the amount of oil discharged from the layer 14, providing such a constant oil application amount. Needless to say, since the oil is discharged continuously from the oil application roller, the weight ratio between the offset-preventing oil and the curable oil-retention material changes with time with the ratio of the rubber becoming higher during use.

To impregnate the oil retention/supply layer 14 with a mixture of the offset-preventing oil and the curable oil-retention material, any suitable method, such as immersion, brush coating, and rubbing, can be used, depending on the properties of the mixture. After impregnation with the offset-preventing oil and the curable oil-retention material, the curable oil-retention material is cured under the curing conditions thereof.

The oil retention/supply layer 14 of an oil application roller according to the present invention increases in its surface hardness to about 20 times or more after impregnation with the offset-preventing oil and curing of the rubber, compared to its surface hardness before the impregnation and the curing. For example, the oil retention/supply layer 14, which exhibits an Asker-C hardness of 1 before the impregnation, can exhibit an Asker-C hardness of 27 after the impregnation and curing.

The oil retention/supply layer 14 itself does not substantially swell by the offset-preventing oil. Therefore, consumption of oil does not cause an outside diameter of the layer to change, making it possible to secure a nip width between the layer and a toner image-fixing member (a fixing belt or a fixing roller, onto which the oil application roller supplies the oil) and to apply a very small amount of offset-preventing oil therefrom onto the fixing member) steadily for a long period of time.

Figure 2:
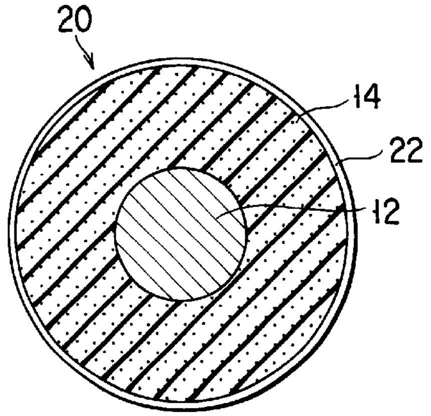
FIG. 2 is a schematic sectional view illustrating an oil application roller according to a second embodiment of the present invention.

FIG. 2 is a schematic sectional view illustrating an oil application roller according to a second embodiment of the present invention. In FIG. 2, the same reference numerals as in FIG. 1 are used to indicate the same elements, and detailed explanations thereof may not be given.

An oil application roller according to the present invention, shown in FIG. 2, has a surface layer 22 on the outer surface of the oil retention/supply layer 14 of the oil application roller 10 shown in FIG. 1. The surface layer 22 fills the pores, in and at the surface of the layer 14, resulting from the porousness of the oil retention/supply layer 14. The surface layer 22 is very thin, for example, 20 $\mu$m to 300 $\mu$m in thickness. It is possible to form the surface layer 22 by immersing the oil retention/supply layer 14 in a mixture of the offset-preventing oil and the curable oil-retention material and then curing the curable oil-retention material. The offset-preventing oil and the curable oil-retention material are preferably mixed at a ratio such that the resulting mixture may have a viscosity of from 50 CS to 35,000 CS (at a temperature of 25° C.).

The surface layer 22 serves to smoothen the surface of the oil retention/supply layer 14 by filling the fine pores in the layer 14. When an oil application roller according to the present invention has such a surface layer 22, it is possible to further reduce nonuniform oil application due to oil banks generated on a surface of a fixing roller, and hence the oil application roller is preferably used in a full-color fixing unit, in particular. The surface smoothness of an oil application roller according to the present invention can be expressed in terms of surface glossiness. The oil application roller exhibits a surface glossiness of 1.0% or more even without forming the surface layer 22, but exhibits a surface glossiness of 3.0% or more by forming the surface layer 22 thereon, significantly improving the surface smoothness. In the present invention, a surface glossiness is measured in accordance with JIS-Z8741-1983, 75-Degree Mirror Glossiness. A glossiness measuring device, GS-1001DP of Nippon Denshoku Kogyo, can be used for such measurement.

Figure 3:
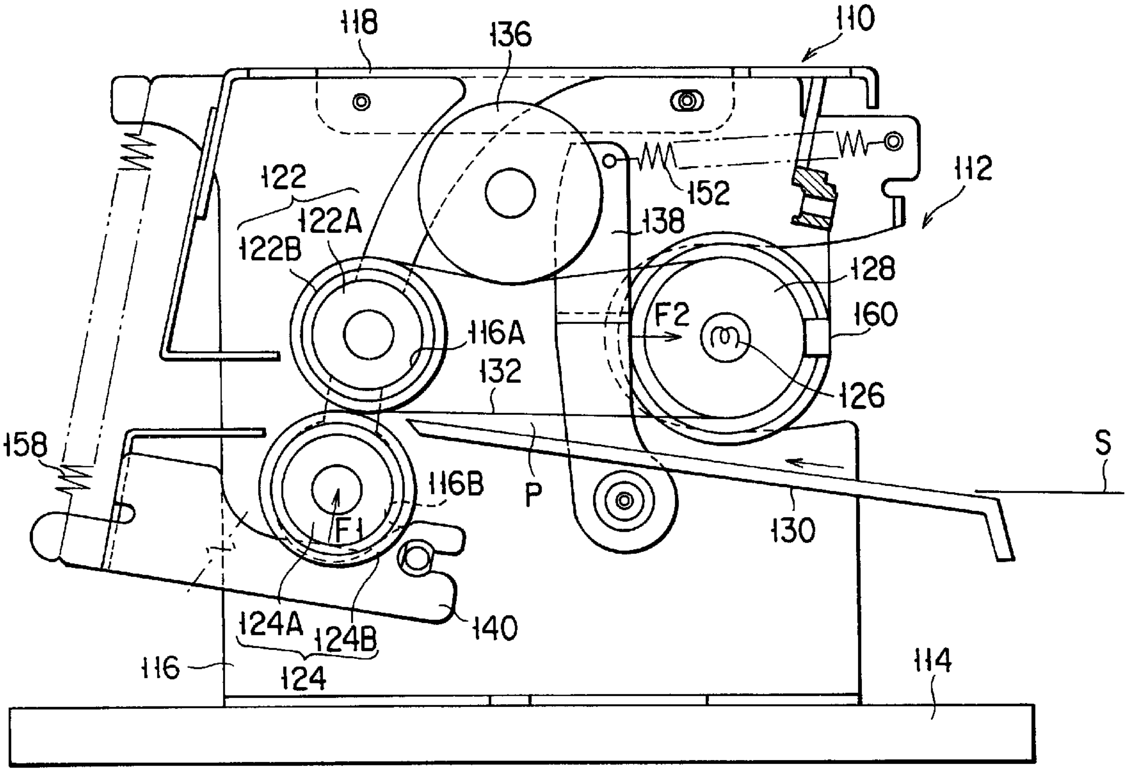
FIG. 3 is a schematic front view illustrating an entire construction of a toner image-fixing unit.

FIG. 3 is a schematic front view illustrating a toner image-fixing unit entirely.

A fixing unit 110, as shown in FIG. 3, comprises a housing 112 fixed to a frame of an electrophotographic image-forming apparatus (not shown) such as an electronic copying machine. The housing 112 comprises a base stand 114 fixed directly to the frame, a pair of attaching stays 116 fixed so as to stand on the base stand 114, and a top board 118 for joining upper sections of the pair of attaching stays 116.

A direction indicated by an arrow in FIG. 3 is defined as one direction in which to convey a sheet S carrying an unfixed image (briefly, unfixed sheet S). Specifically, the attaching stays 116 are located on both sides of the unfixed sheet S to be conveyed along the one direction, and extend in the one direction. The sheet S is conveyed with its toner image directed upward.

The fixing unit 110 comprises a fixing roller 122, a press roller 124, and a heating roller 128. The the fixing roller 122 is supported by the pair of attaching stays 116 freely rotatably around the central axis of the fixing roller 122. The press roller 124 is supported by the stays 116 movably in the substantially vertical direction and freely rotatably around the central axis of the press roller 124. The press roller 124 abuts against the fixing roller 122 below the roller 122. The heating roller 128 is supported by the stays 116 freely rotatably around the central axis of the heating roller 128 and is located upstream of the fixing roller 122 in the direction of conveying the unfixed sheet S. The heating roller 128 accommodates a heating source 126, for example, a halogen lamp, as a first heating means.

The fixing unit 110 further comprises a guide plate 130 and an endless fixing belt 132. The guide plate supports the underside (i.e., the face having no unfixed toner image formed) of the unfixed sheet S conveyed thereto and guides the unfixed sheet S toward the contact portion between the fixing roller 122 and the press roller 124. The fixing belt 132 runs over the heating roller 128 and the fixing roller 122. The guide plate 130 and the fixing belt 132 define therebetween a preheating path P through which the unfixed sheet S is conveyed while preheated from the upper side and lower side thereof by the guide plate 130 and the fixing belt 132.

The fixing unit 110 further comprises an oil application roller 136, a tension lever 138, and a pressing lever 140. The oil application roller 136 serves to apply an offset-preventing oil on the outer surface of the fixing belt 132. The tension lever 138 applies a predetermined tension in cooperation with the oil application roller 136 to the fixing belt 132 by dislocating the heating roller 128 away from the fixing roller 122. The pressing lever 140 serves to press the press roller 124 against the fixing roller 122 by dislocating the press roller 124 toward the fixing roller 122.

Accordingly, at the fixing unit 110, the unfixed sheet S is conveyed over the guide plate 130 by a conveying mechanism (not shown), with its underside surface (which has no unfixed toner formed thereon) contacted and supported by the guide plate, and is guided toward the contact portion (the nip portion) between the fixing belt 132 and the press roller 124. Thus, the unfixed sheet S passes through the nip, while being heated and pressed, thereby fixing the toner image on the sheet.

The fixing roller 122 comprises a core shaft 122A and a covering layer 122B placed coaxially with the shaft 122A on the outer periphery of the core shaft 122A. The core shaft 122A is supported at its axis freely rotatably via bearings by a pair of first axis-supporting holes 116A of circular shape, which are formed in the attaching stays 116. The fixing belt 132 directly contacts and moves over the covering layer 122B. The core shaft 122A is formed of, for example, an iron shaft, while the covering layer 122B is formed of, for example, a heat-resistant elastic silicone rubber material provided on the outer periphery of the core shaft 122A.

A first driven gear (not shown) is fixed coaxially at one end of the core shaft 122A and is engaged with a driving gear constituting a driving mechanism (not shown). A driving force from the driving mechanism is transmitted through the driving gear to the first driven gear, thereby rotating the fixing roller 122.

The above-mentioned press roller 124 has a core shaft 124A and a covering layer 124B provided coaxially with the core shaft 124A on the peripheral surface of the shaft 124A. The shaft 124 is supported at its axis freely rotatably via bearings by second axis-supporting elongated holes 116B formed in the attaching stays 116, extending in substantially vertical direction. Further, the core shaft 124A is supported movably in the extending direction of the holes 116B. The core shaft 124A is formed of, for example, an iron shaft, while the covering layer 124B is formed of, for example, a heat-resistant elastic silicone rubber material.

A second driven gear (not shown) is fixed at one end of the core shaft 124A and is engaged with the first driven gear. Thus, a driving force from the first driven gear is transmitted to the second driven gear, thereby rotating the press roller 124 at the same speed as, and in the opposite direction to, the fixing roller 122.

For the fixing unit 110, various conditions are set such that, for example, a speed of sending or feeding an unfixed sheet S is from 10 mm/sec to 400 mm/sec, a gap of the preheating path P is from 0.5 mm to 10 mm, and a preheating time for an unfixed sheet S to pass a distance between the centers of the fixing roller 122 and the heating roller 128 is from 0.1 second to 4 seconds.

Figure 4:
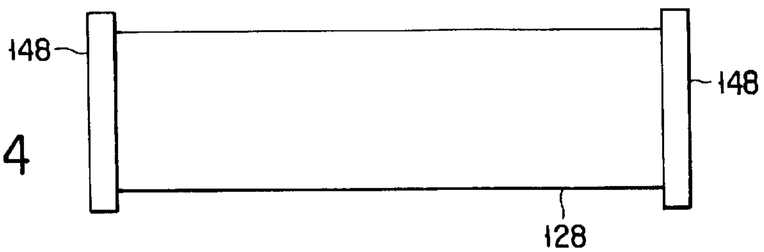
FIG. 4 is a side view illustrating a heating roller of the fixing unit shown in FIG. 3.

As mentioned earlier, the heating roller 128 accommodates the heating source 126. The heating source may be a 600-W halogen lamp having an intensity of light 50% larger at both ends than at the center. The heating roller 128 is constituted by, for example, a hard anodized aluminum pipe, having collars 148 made of a heat-resistant polyether ether ketone (PEEK) pressure-fitted at both ends, as shown in FIG. 4, thereby preventing the fixing belt 132 from snaking or moving to one side.

As mentioned above, the fixing unit 110 comprises the guide plate 130. The guide plate 130 guides the unfixed sheet S, carried by a carrying mechanism (not shown), toward the contact portion between the fixing roller 122 and the press roller 124. The guide plate 130 is attached fixedly to the pair of attaching stays 116 on the right side in FIG. 3, namely, upstream in the direction of carrying the unfixed sheet S.

Figure 5:
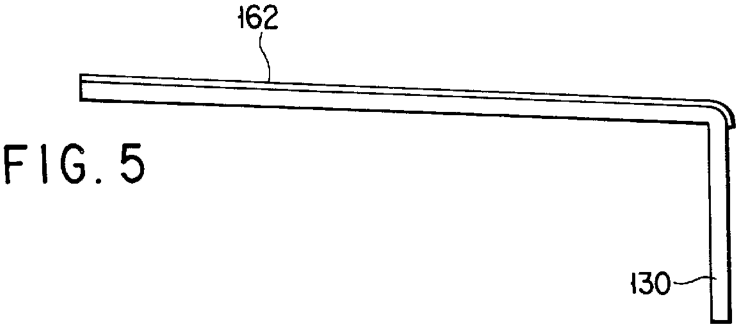
FIG. 5 is a front view illustrating a guide plate of the fixing unit shown in FIG. 3.

The guide plate 130 comprises a release-treated layer 162 composed of a fluororesin, such as PTFE (polytetrafluoroethylene), on the surface, as shown in FIG. 5. The guide plate 130 is grounded so as to not disturb the unfixed image, while it is possible to use an electricity-removing brush, a barrister device, a diode, etc., instead of grounding.

As shown in FIG. 3, the underside section of the fixing belt 132 is set to run almost horizontally toward the left side. Immediately below the heating roller 128, a distance between the guide plate 130 and the fixing belt 132 is set at about 5 mm to 20 mm. Thus, the guide plate 130 is set slant against the horizontal underside section of the fixing belt 132 so that the unfixed sheet S may move gradually upward to the nip. In other words, the guide plate 130 of an almost flat shape is set such that its one end near the nip is placed at a higher level than the other end and at a lower position than the nip.

The underside section of the fixing belt 132 and the guide plate 130 define a wedge-shape carrying space with the nip position as an apex. Thus, as the unfixed sheet S is carried on the guide plate 130, the sheet S is pressed against the outer surface of the press roller 124 at a level slightly below the level of the nip between the fixing belt 132 and the press roller 124. Then the sheet S is brought along the outer periphery of the press roller 124 to the nip position without fail. At the nip position, the sheet S is in pressurized contact under a predetermined pressure F1 and at the same time heated by the fixing belt 132. Before being heated this way, the unfixed toner on the sheet S has been preheated by thermal radiation from the fixing belt 132. Thus, the preheating and the direct heating at the nip position cause the unfixed toner to be thermally fixed.

The fixing belt 132 preferably has a heat capacity between 0.002 cal/° C. and 0.025 cal/° C. per square centimeter in order to radiate heat for preheating the unfixed toner on the sheet S to a fixing temperature without giving an excess heat. For this purpose, the fixing belt 132 comprises an endless belt body made of, e.g., an electroformed nickel or a polyimide, and a heat-resistant elastic release layer made of a silicone rubber and attached to the outer periphery of the belt body.

The fixing unit 110 comprises an oil application roller 136 on the outer periphery of the fixing belt 132 to apply a very small amount of an offset-preventing oil. The oil application roller 136 is constituted by an oil application roller according to the present invention. Incorporation of the oil application roller 136 into the fixing unit 110 in the above way makes it possible to steadily apply a very small amount of oil to the outer periphery of the fixing belt 132.

The fixing unit 110 comprises a tension lever 138 as a mechanism for applying a tension to the fixing belt 132. The tension lever 138 is supported swingabaly at its lower end by the pair of attaching stays 116, and is connected at its upper end through a tension spring 152 to an end of the pair of attaching stays 116. The tension spring 152 applies a force so that the tension lever 138 may be forcedly pressed at the center against the outer periphery of the heating roller 128 with a predetermined pressing force F2.

The pressing force of the tension spring 152 is applied via the tension lever 138 to the heating roller 128 so that the heating roller 128 may be dislocated away from the fixing roller 122. Thus, the fixing belt 132, endlessly placed over the heating roller 128 and over the fixing roller 122, is tensioned with a predetermined tension with its upperside section controlled by the oil application roller 136. Therefore, as the fixing roller 122 rotates, the fixing belt 132 is forced to run endlessly and steadily without slip or slack.

A press mechanism 154, which causes the press roller 124 and the fixing roller 122 to pressure-contact with each other at the position of winding the fixing belt 132 on the fixing roller 122, will now be explained. The press mechanism 154 comprises a pressing lever 140 and a pressing spring 158. The pressing lever 140 is supported swingabaly at its one end though an axis by the pair of attaching stays 116, and can abut against the core shaft 124A of the press roller 124 from downward. The pressing spring 158 is jointed at its lower end with the other end of the pressing lever 140, and is jointed at its upper end with an upper section of the pair of attaching stays 116. The pressing spring 158 applies a pressing force to the pressing lever 140 so that the lever 140 may abut the outer periphery of the core shaft 124A of the press roller 124 with the predetermined pressing force F1, thereby causing the fixing belt 132 and the press roller 124 to be in contact with each other. Thus, the press roller 124 and the fixing belt 132 are in rotative contact with each other with a predetermined nip width.

In the fixing unit shown in FIG. 3, the fixing roller 122 and the press roller 124 are attached such that a line passing the center of the fixing roller 122 and the center of the press roller 124 is slant clockwise with a predetermined angle with respect to a perpendicular line downward from the center of the fixing roller 122. Thus, the nip position (the center of the nip width) between the press roller 124 and the fixing belt 132 is defined to lie slightly away from just under the center of the fixing roller 122 in the direction of carrying the unfixed sheet S (leftward in FIG. 3).

The fixing unit 110 comprises a thermistor 160 for regulating the temperature of the fixing belt 132. The thermistor 160 is in contact with a non-sheet-passing section of the fixing belt 132, namely, a right-hand part of the fixing belt 132 winding directly the heating roller 128 in FIG. 3 so that the thermistor 160 may detect the surface temperature of the belt. The thermistor 160 sends information on the temperature of the belt to an electrically connected control unit (not shown).

A fixing unit comprising an oil application roller according to the present invention is not limited to the unit shown in FIG. 3.

For example, an oil application roller according to the present invention can be used to apply an offset-preventing oil to a fixing roller or a fixing belt in any suitable fixing unit of electrophotographic image-forming apparatus, such as an electrophotographic facsimile, electrophotographic printer, etc.

Figure 6:
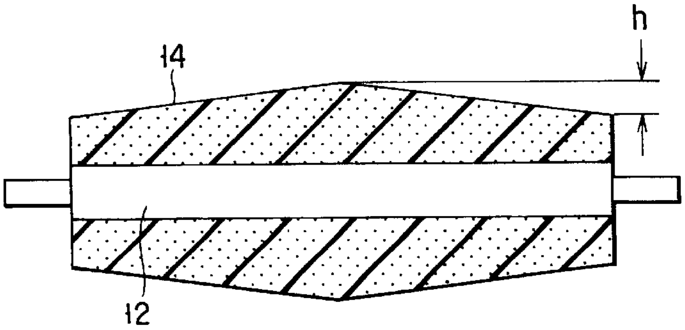
FIG. 6 is a sectional view illustrating a preferred shape of an oil application roller according to the present invention.
Figure 7:
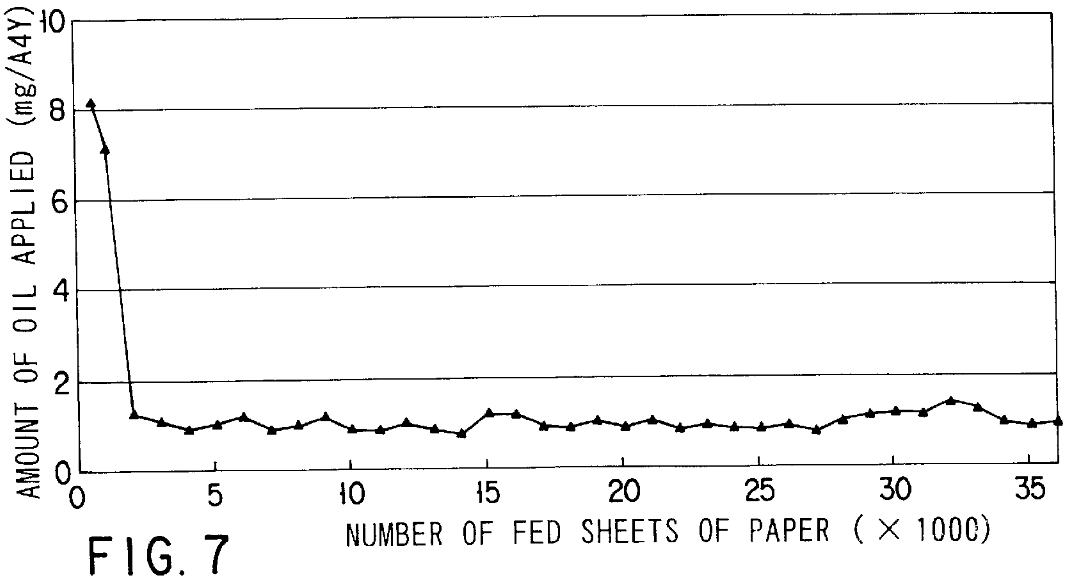
FIG. 7 is a graph showing a change of the oil application amount in relation to the number of sheets of paper having passed through an oil application roller prepared in Example 1 described hereinafter.
Figure 8:
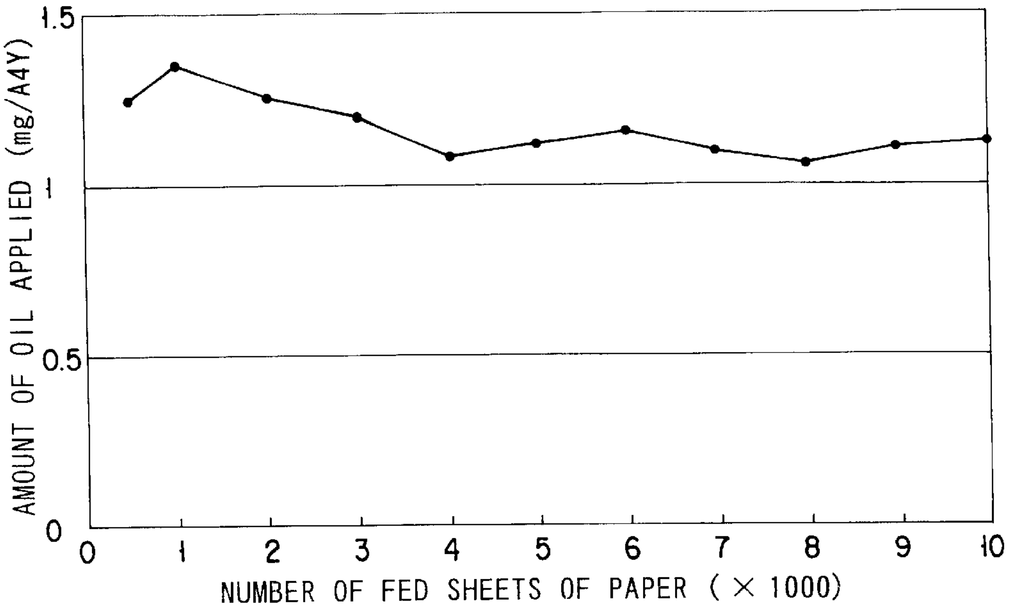
FIG. 8 is a graph showing a change of the oil application amount in relation to the number of sheets of paper having passed through an oil application roller prepared in Example 3 described hereinafter.
Figure 9:
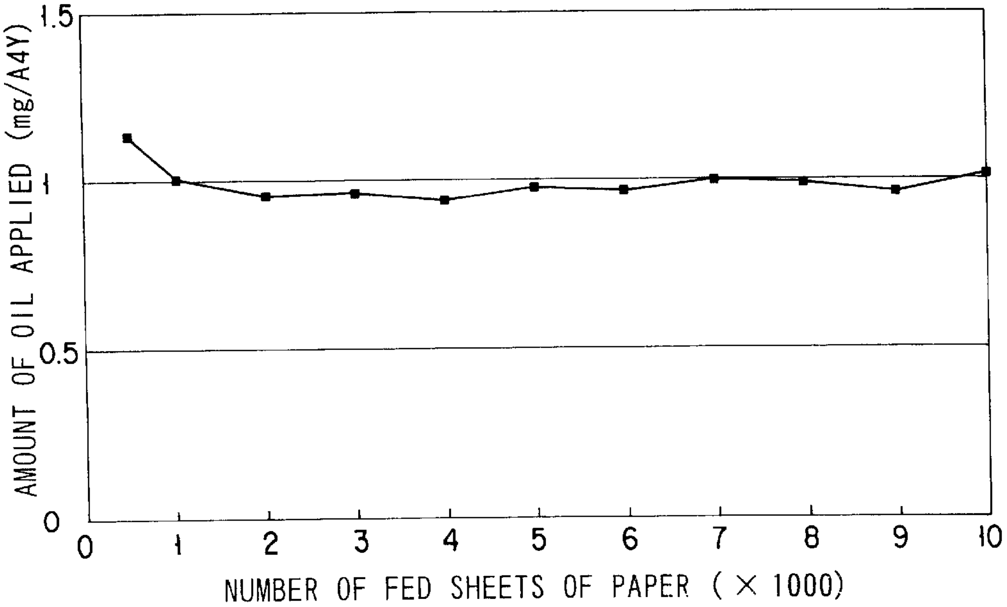
FIG. 9 is a graph showing a change of the oil application amount in relation to the number of sheets of paper having passed through an oil application roller prepared in Example 4 described hereinafter.
Figure 10:
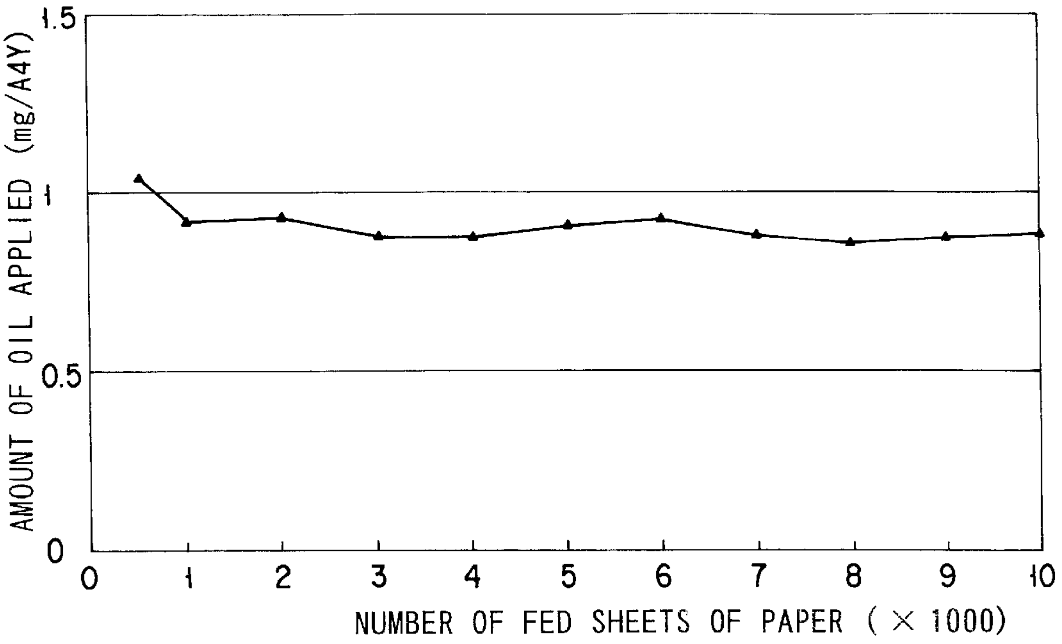
FIG. 10 is a graph showing a change of the oil application amount in relation to the number of sheets of paper having passed through an oil application roller prepared in Example 5 described hereinafter.

As explained above, an oil application roller according to the present invention can be incorporated into a fixing unit so as to apply a very small amount of oil to an outer peripheral surface of a fixing belt (a fixing belt 132 in FIG. 3). It has been found that such an oil application roller having a regular crown shape as shown in FIG. 6 causes a tension to be applied more evenly to a fixing belt, thereby making it possible to apply the oil at a more constant rate. A regular crown shape denotes an outer shape of the roller, with its diameter continuously increasing from the both end portions thereof towards its center. FIG. 6 is an exaggerated view showing an axial section of such an oil application roller according to the present invention. An oil retention/supply layer 14 of this oil application roller has the smallest diameter at both end portions and the largest diameter at the center. A difference h between the largest and smallest diameters may be 0.05 mm to 1.0 mm.

The present invention will be explained below by way of its Examples, but the present invention should not be limited to these Examples.

EXAMPLE 1

An iron core shaft of 6 mm in diameter was covered with porous melamine resin, BASOTECT, available from BASF, to a 14-mm thickness. The porous melamine resin was impregnated with a mixture of curable liquid silicone rubber, KE108, produced by Shin-Etsu Chemical and dimethyl silicone oil, KF96-300, produced by Shin-Etsu Chemical, at a weight ratio of 1:10. The impregnation amount of the mixture was 230 g. Then, the liquid silicone rubber was cured, providing an oil application roller of the present invention, having an outside diameter of 34 mm. The surface glossiness of the oil application roller was measured in accordance with JIS-Z-8741-1983 75-degree Mirror Gloss with a glossiness-measuring instrument, GS-1001DP, produced by Nippn Denshoku Kogyo. It was 1.0%.

EXAMPLE 2

An oil application roller of the present invention was prepared in the same way as in Example 1, except that the weight ratio of the liquid silicone rubber to the dimethyl silicone oil was 1:5. The surface glossiness of this oil application roller was measured in the same way as in Example 1 and was 1.0%.

EXAMPLE 3

An iron core shaft of 6 mm in diameter was covered with porous melamine resin, BASOTECT, available from BASF, to a 14-mm thickness. The porous melamine resin was impregnated with a mixture of curable liquid silicone rubber, KE108, produced by Shin-Etsu Chemical and dimethyl silicone oil, KF96-300, produced by Shin-Etsu Chemical, at a weight ratio of 1:5. The impregnation amount of the mixture was 230 g. Then, the liquid silicone rubber was cured while centrifuging the core shaft, providing an oil application roller of the present invention with a surface layer, having an outside diameter of 34 mm. The surface glossiness of the oil application roller was measured in the same way as in Example 1 and was 3.5%.

EXAMPLE 4

An iron core shaft of 6 mm in diameter was covered with porous melamine resin, BASOTECT, produced by BASF, to a 14-mm thickness. The porous melamine resin was impregnated with a mixture of curable liquid silicone rubber, KE108, produced by Shin-Etsu Chemical and dimethyl silicone oil, KF96-300, produced by Shin-Etsu Chemical, at a weight ratio of 1:10. The impregnation amount of the mixture was 230 g. Then, the liquid silicone rubber was cured. Thereafter, the roll surface was coated with a 5-gram mixture of curable liquid silicone rubber, KE108, produced by Shin-Etsu Chemical and dimethyl silicone oil, KF96-300, produced by Shin-Etsu Chemical, at a weight ratio of 1:5, providing an oil application roller of the present invention, having an outside diameter of 34 mm. The surface glossiness of the oil application roller was measured in the same way as in Example 1 and was 28.1%.

EXAMPLE 5

An iron core shaft of 6 mm in diameter was covered with porous melamine resin, BASOTECT, produced by BASF, to a 14-mm thickness. The porous melamine resin was impregnated with a mixture of curable liquid silicone rubber, KE45, produced by Shin-Etsu Chemical and dimethyl silicone oil, KF96-300, produced by Shin-Etsu Chemical, at a weight ratio of 1:10. The impregnation amount of the mixture was 230 g. Then, the liquid silicone rubber was cured, providing an oil application roller of the present invention, having an outside diameter of 34 mm. The surface glossiness of the oil application roller was measured in the same way as in Example 1 and was 1.0%.

COMPARATIVE EXAMPLE 1

A silicon sponge layer of 12 mm in thickness was formed on an iron core shaft of 6 mm in diameter and was impregnated with dimethyl silicone oil. Then, an oil application roller was prepared by placing 2 mm-thick aramid felt over the roll. Only 27.1 gram of dimethyl silicone oil penetrated into the sponge layer.

<Oil Application Test>

An oil application test was conducted on the oil application rollers prepared in Examples 1–5 and Comparative Example 1 with the rollers incorporated as an oil application roller 136 into a fixing unit as shown in FIG. 3. A heating roller, a fixing roller, a press roller, a fixing belt, a nip width between the oil application roller and the fixing belt, a fixing temperature, recording paper, a feed rate of recording paper, and a mode of feeding a sheet were specified below:

- Heating roller: Aluminum pipe of 28 mm in outside diameter coated with polytetrafluoroethylene (PTFE) resin having a thickness of 20 μm;
- Fixing roller: SUS core shaft of 20 mm in outside diameter covered with silicone rubber (with a JIS-A hardness between 12 and 13 degree) of 4 mm in thickness, having a final outside diameter of 28 mm;
- Press roller: SUS core shaft of 22 mm in outside diameter covered with silicone rubber of 3 mm in thickness to an outside diameter of 28 mm, coated with a mixture of a fluoro-rubber and a tetrafluoroethylene-hexafluoropropylene copolymer (FEP) resin to a thickness of 30 μm;
- Fixing belt: Polyimide belt of 350 mm in width, 70 mm in inside diameter, and 90 μm in thickness, coated with silicone rubber of 200 μm in thickness;
- Nip width between the oil application roller and the fixing belt: 9 mm;
- Fixing temperature: 180° C.;
- Recording paper: A4 sheet, P thickness, produced by Fuji Xerox;
- Feed rate of recording paper (linear speed): 180 mm/second; and
- Mode of feeding a sheet: 10 ppm, A4 white paper fed landscape.

Under the above conditions with a 500-g load applied to an oil application roller on each side, a test was conducted to find whether each test roller applied oil at a rate of 1 mg per A4 sheet of paper. The application rate was determined by weighing the application roller with an electronic balance after feeding a predetermined number of sheets and then by dividing the change in weight by the number of sheets. The purpose of testing on the rollers of Examples 2–5 was to find whether the rate of oil application was changed with a change in the mixing ratio of rubber and oil. The tests on the rollers of Examples 2–5 were ceased when 10,000 sheets were fed.

Immediately after warming up the above fixing unit, OHP films were fed under the same conditions to examine the unevenness of transparency of an OHP film image caused presumably by uneven oil application.

Figure 11:
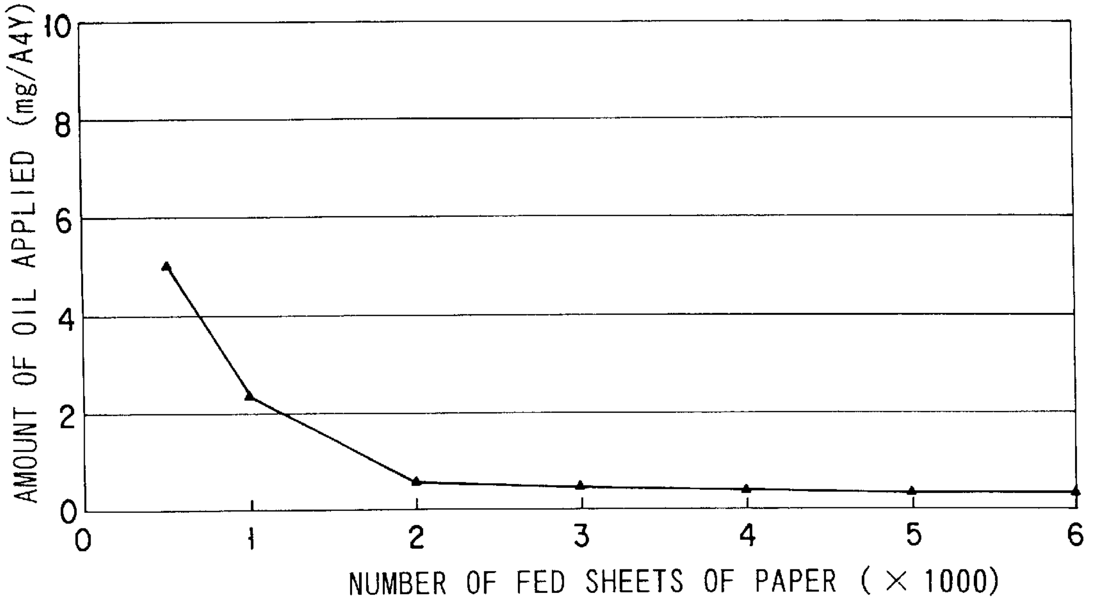
FIG. 11 is a graph showing a change of the oil application amount in relation to the number of sheets of paper having passed through an oil application roller prepared in Comparative Example 1 described hereinafter.

Table 1 shows the results of oil application rate determination for oil application rollers of Examples 1 through 5. FIGS. 7 through 10 show the results of oil application rate determination for oil application rollers of Example 1 and Examples 3–5, respectively. FIG. 11 shows the result of oil application rate determination for the oil application roller of Comparative Example 1.

TABLE 1

| Number of sheets of paper fed (×1000) | Oil amount applied (mg/A4) Example 1 | Example 2 | Example 3 | Example 4 | Example 5 |
|---|---|---|---|---|---|
| 0.5 | 8.27 | 11.3 | 1.25 | 1.13 | 1.04 |
| 1 | 7.24 | 5.64 | 1.35 | 1.01 | 0.92 |
| 2 | 1.38 | 3.05 | 1.25 | 0.95 | 0.93 |
| 3 | 1.18 | 1.78 | 1.20 | 0.96 | 0.88 |
| 4 | 1.02 | 1.43 | 1.08 | 0.94 | 0.88 |
| 5 | 1.14 | 1.25 | 1.12 | 0.98 | 0.91 |
| 6 | 1.25 | 1.13 | 1.16 | 0.97 | 0.93 |
| 7 | 0.96 | 1.01 | 1.10 | 1.01 | 0.89 |
| 8 | 1.10 | 1.18 | 1.06 | 1.00 | 0.86 |
| 9 | 1.24 | 1.09 | 1.11 | 0.97 | 0.88 |
| 10 | 1.03 | 0.93 | 1.13 | 1.02 | 0.89 |
| 11 | 0.99 | | | | |
| 12 | 1.06 | | | | |
| 13 | 0.99 | | | | |
| 14 | 0.85 | | | | |
| 15 | 1.30 | | | | |
| 16 | 1.22 | | | | |
| 17 | 1.01 | | | | |
| 18 | 0.96 | | | | |
| 19 | 1.04 | | | | |
| 20 | 0.96 | | | | |
| 21 | 1.06 | | | | |
| 22 | 0.92 | | | | |
| 23 | 0.99 | | | | |
| 24 | 0.92 | | | | |
| 25 | 0.91 | | | | |
| 26 | 0.95 | | | | |
| 27 | 0.86 | | | | |
| 28 | 1.09 | | | | |
| 29 | 1.16 | | | | |
| 30 | 1.21 | | | | |
| 31 | 1.21 | | | | |
| 32 | 1.43 | | | | |
| 33 | 1.29 | | | | |
| 34 | 1.00 | | | | |
| 35 | 0.91 | | | | |
| 36 | 0.96 | | | | |

TABLE 2

| Number of sheets of paper fed (×1000) | Oil amount applied (mg/A4) |
|---|---|
| 0.5 | 5.0 |
| 1 | 2.4 |
| 2 | 0.5 |
| 3 | 0.5 |
| 4 | 0.4 |
| 5 | 0.3 |
| 6 | 0.3 |

The results of the test show that after feeding 3000 sheets the oil application rollers of Examples 1 and 2 kept a target application rate of 1 mg/A4. For the oil application roller of Example 1, the application rate was kept constant after feeding 30,000 sheets, a life of current fixing equipment using color toner. Even after feeding 36,000 sheets, there was no problem with the oil application roller of Example 1, and the test was discontinued there. At the completion of the test, the oil application roller of Example 1 consumed 42 gram of oil, indicating that 80% of the initial oil content still remained.

For the oil application roller of Example 2, the application rate was kept constant from 3,000 sheets to 10,000 sheets. From these results for the oil application rollers of Examples 1 and 2, it is confirmed that even with a change in the ratio of rubber to oil contained in the oil retention/supply layer of an oil application roller according to the present invention, the rate of oil application did not change.

For the oil application rollers of Examples 3 through 5, the rate of oil application was nearly constant at 1 mg/A4 from the beginning to 10,000 sheets.

For the oil application roller of Comparative Sample 1, the rate of oil application became insufficient with respect to the target value when 2,000 sheets had been fed, decreasing afterwards with no possibility of regaining the target value for the rate of oil application. Judging that the oil application roller of Comparative Sample 1 was not capable of use when 6,000 sheets had been fed, the test was discontinued.

For the oil application rollers of Examples 1, 2 and 5 uneven transparency caused presumably by uneven oil application due to surface unevenness of the melamine porous body was found to a slight degree on OHP images. For the oil application rollers of Examples 3 and 4, no such uneven transparency was found. For the oil application roller of Comparative Sample 1, uneven transparency caused presumably by uneven oil application due to uneven pitches of winding aramid felt was found to a strong degree on an OHP image.

As described above, according to the present invention, there is provided a long-life oil application roller having a simpler structure than the prior art, having an outside diameter unchanged, with incomparable abilities to contain a large amount of oil and to maintain a steady rate of oil application. When an oil application roller according to the present invention has the surface layer, there is less unevenness of oil application.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An oil application roller consisting a core shaft and an oil retention/supply layer formed to cover an outer peripheral surface of the core shaft, said oil retention/supply layer being made of a porous elastic material which exhibits no substantial swelling against an offset-preventing oil used, and is impregnated with a mixture containing an offset-preventing oil and a curable oil-retention material, with said curable oil-retention material having been cured, wherein said oil retention/supply single layer is situated in an outermost portion of the roller, and directly contacts with a fixing member in use.

2. The roller according to claim 1, wherein said roller has a surface glossiness of 1% or more.

3. The roller according to claim 1, wherein said curable oil-retention material is a curable rubber.

4. The roller according to claim 1, wherein said offset-preventing oil comprises a silicone oil, and said curable oil-retention material comprises a two-pack curable silicone rubber.

5. The roller according to claim 1, wherein said offset-preventing oil comprises a silicone oil, and said curable oil-retention material comprises a one-pack curable silicone rubber.

6. The roller according to claim 1, wherein said offset-preventing oil and curable oil-retention material are impregnated at an initial weight ratio of from about 1:1 to 20:1.

7. The roller according to claim 1, wherein said roller has a regular crown shape.

8. An oil application roller consisting a core shaft and an oil retention/supply layer formed to cover an outer peripheral surface of the core shaft, said oil retention/supply layer being made of a porous melamine resin elastic material, said porous melamine resin elastic material being impregnated with a mixture containing an offset-preventing oil and a curable oil-retention material, with said curable oil-retention material having been cured, wherein said oil retention/supply single layer is situated in an outermost portion of the roller, and directly contacts with a fixing member in use.

9. The roller according to claim 8, wherein said roller has a surface glossiness of 1% or more.

10. The roller according to claim 8, wherein said curable oil-retention material is a curable rubber.

11. The roller according to claim 8, wherein said offset-preventing oil comprises a silicone oil, and said curable oil-retention material comprises a two-pack curable silicone rubber.

12. The roller according to claim 8, wherein said offset-preventing oil comprises a silicone oil, and said curable oil-retention material comprises a one-pack curable silicone rubber.

13. The roller according to claim 8, wherein said offset-preventing oil and curable oil-retention material are impregnated at an initial weight ratio of from about 1:1 to 20:1.

14. The roller according to claim 8, wherein said roller has a regular crown shape.

15. An oil application roller consisting as an uppermost layer, an oil retention/supply layer being made of a porous elastic material which exhibits no substantial swelling against an offset-preventing oil used, said porous elastic material containing a mixture of an offset-preventing oil and a curable oil-retention material such that an amount of the oil provided or exuded from the oil retention/supply layer may be substantially constant, with said curable oil-retention material having been cured, wherein said outermost oil retention/supply single layer directly contacts with a fixing member in use.

16. The roller according to claim 15, wherein said roller has a surface glossiness of 1% or more.

17. The roller according to claim 15, wherein said curable oil-retention material is a curable rubber.

18. The roller according to claim 15, wherein said offset-preventing oil comprises a silicone oil and said curable oil-retention material comprises a two-pack curable silicone rubber.

19. The roller according to claim 15, wherein said offset-preventing oil comprises a silicone oil, and said curable oil-retention material comprises a one-pack curable silicone rubber.

20. The roller according to claim 15, wherein said offset-preventing oil and curable oil-retention material are impregnated at an initial weight ratio of from about 1:1 to 20:1.

21. The roller according to claim 15, wherein said roller has a regular crown shape.

* * * * *